United States Patent Office 2,798,660
Patented July 9, 1957

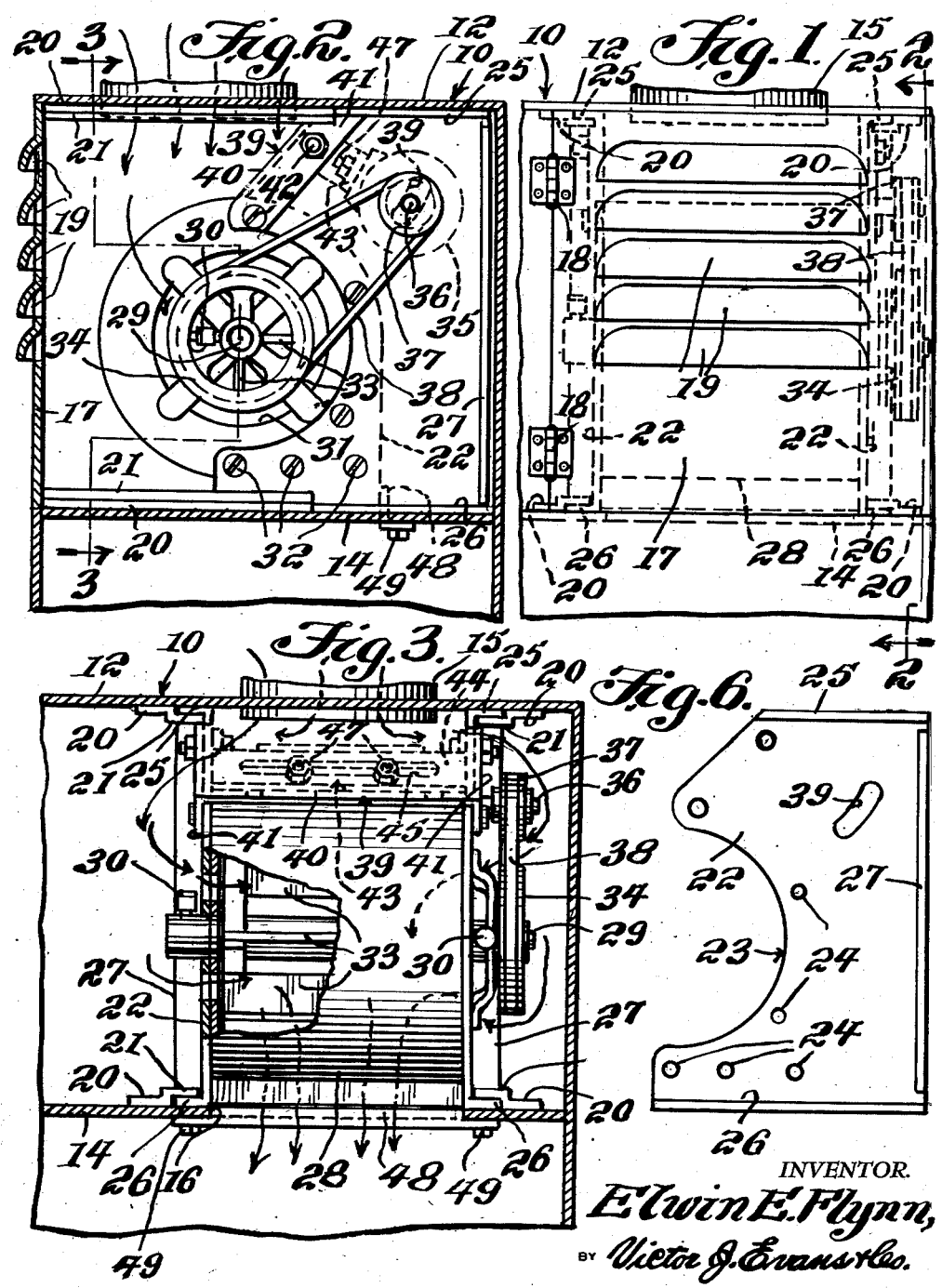

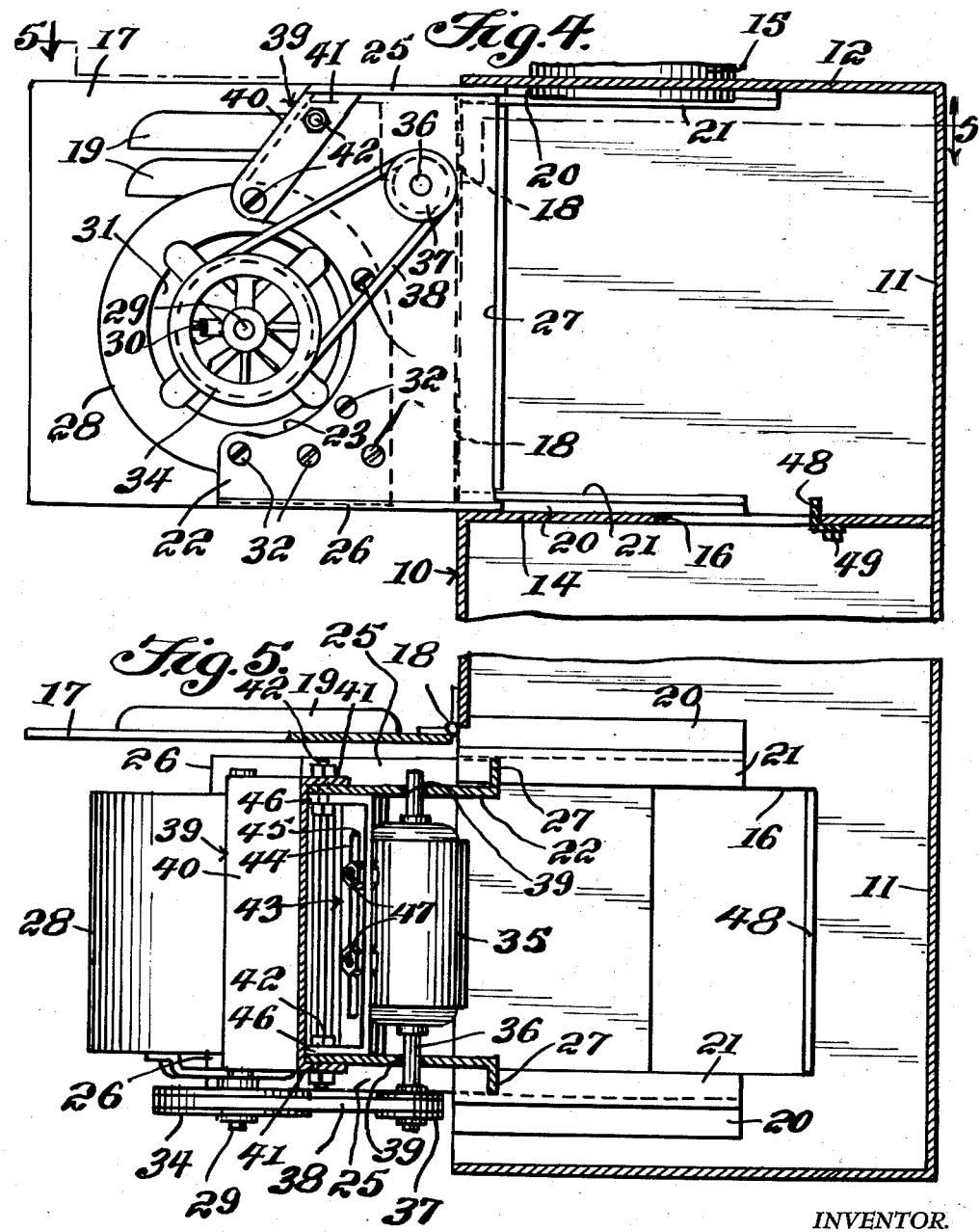

2,798,660
BLOWER MOUNTING

Elwin E. Flynn, Grand Rapids, Mich.

Application November 30, 1954, Serial No. 472,104

4 Claims. (Cl. 230—117)

This invention relates to a blower or fan, and more particularly to a mounting mechanism for a blower.

The object of the invention is to provide a means for slidably mounting or supporting a blower such as a hot air blower, whereby the blower can be moved out of its cabinet or housing so that access can be readily gained to the parts of the blower, as for example when the blower is to be serviced or repaired.

Another object of the invention is to provide a blower mounting mechanism which includes a means for slidably supporting the blower so that the blower can be readily moved out of its housing and wherein there is provided a hingedly mounted door which has ventilating openings therein, the heated air or other gaseous medium being sucked in by the blower through the top of a housing and then expelled through the bottom of the housing.

A further object of the invention is to provide a blower mounting which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a fragmentary front elevational view of the blower mounting, constructed according to the present invention.

Figure 2 is a sectional view taken on the line 2—2 of Figure 1.

Figure 3 is a sectional view taken on the line 3—3 of Figure 2.

Figure 4 is a vertical longitudinal sectional view taken through the blower assembly, and showing the blower in its outward or extended position.

Figure 5 is a sectional view taken on the line 5—5 of Figure 4.

Figure 6 is a side elevational view of one of the plates.

Referring in detail to the drawings, the numeral 10 designates a housing or cabinet which can be made of any suitable material, and the housing 10 includes a vertically disposed back wall 11, a horizontally disposed top wall 12, and a horizontally disposed bottom wall 14, Figure 4. Extending through the top wall 12 is a conduit 15 which is adapted to be connected to a suitable source of supply of hot air as for example the conduit 15 may be connected to a hot air heater. The bottom wall 14 is provided with an opening 16 whereby the air leaving the blower can pass out through the opening 16 to any suitable locality.

The front end of the housing 10 is open, and a door 17 is mounted for closing relation with respect to the opening in the front of the housing 10. The door 17 may be hingedly connected to the housing 10 by means of hinges 18, Figure 5, and the door 17 is provided with a plurality of spaced parallel louver openings 19 whereby air for cooling the motor can enter the interior of the housing.

There is further provided a pair of vertically disposed spaced parallel plates 22, and one of the plates is shown in Figure 6. Each of the plates 22 has the same construction and each includes an arcuate cutout 23, and there is provided in each plate a plurality of openings 24 whereby suitable securing elements such as bolt and nut assemblies can extend through these openings 24. A lip 25 extends along the upper edge of the plate 22 and is secured thereto or formed integral therewith, and a lip 26 extends along the lower edge thereof. A reinforcing rib 27 extends vertically along the rear edge of each plate. Secured to the upper and lower walls 12 and 14, are rails 20 which are each provided with an offset portion 21, and the offset portions 21 coact to define trackways for slidably receiving therein the lips 25 and 26 of the plates 22. The rails 20 are arranged in pairs so that the plates 22 are maintained in their proper position as they slide back and forth in the housing.

The blower is indicated generally by the numeral 28, and the blower 28 includes a driven shaft 29 which may have grease or lubrication fittings 30 arranged in engagement therewith. The sides of the blower 28 may be provided with openings 31 whereby the air can enter the interior of the blower before it is blown out through the opening 16 in the bottom wall 14. The rotary blades 33 of the blower 28 may be connected to the driven shaft 29 in any suitable manner. The numeral 32 designates suitable securing elements such as screws or bolt and nut assemblies which extend through the apertures 24 in the plate 22 and into the blower casing so that the blower casing and plates 22 are secured together. Thus, as the plates slide back and forth the blower 28 will also move or slide.

Mounted on an end of the driven shaft 29 is a pulley 34, and the numeral 35 designates a motor of conventional construction which is adapted to be connected to a suitable source of electrical energy in any suitable manner. A drive shaft 36 is driven by the motor 35, and the drive shaft 36 has a pulley 37 mounted thereon. An endless belt 38 is trained over the pair of pulleys 37 and 34.

The mounting of the present invention further includes a support member which is indicated generally by the numeral 39, and the support member 39 includes a web 40 and extending at right angles from the ends of the web 40 are a pair of spaced parallel ears 41 which may be secured to the plates 22 in any suitable manner, as for example by means of bolt and nut assemblies 42.

There is further provided a body member which is indicated generally by the numeral 43, Figure 5, and the body member 43 includes a bar 44 which is provided with an elongated slot 45. Extending from the bar 44 and arranged at right angles therewith is a pair of spaced parallel lugs 46 which may be connected to the plates by the bolt and nut assemblies 42. The body member 43 provides a support for the motor 35, since the motor 35 has bolt and nut assemblies 47 extending therefrom and the bolt and nut assemblies 47 also extend through the slot 45 in the bar 44. An angle iron 48 may be secured to the bottom wall 14 in any suitable manner, as for example by means of bolts 49, and the angle iron 48 serves as a stop member and is abutted or engaged by the inner edges of the plates 22 to limit inward movement of the plates and blower.

From the foregoing it is apparent that there has been provided a mounting whereby a blower such as the blower 28 can be normally encased in a housing such as the housing 10. Normally the parts are in the position shown in Figures 1, 2 and 3, so that air such as air from a hot air heater enters the housing 10 through the conduit 15, and this hot air then passes into the blower 28 through the openings 31. The blades of the rotary blower are rotated by means of the belt 38 which is operated by the motor 35 so that the hot air is discharged out through a suitable opening in the bottom of the blower casing and this hot air then passes out through the outlet opening 16 in the bottom wall 15 whereby it can be directed to any suitable locality as for example the hot air can be passed to radiators or heating ducts in a building. In the event that access is to be gained to the parts of the blower as for example when the fittings 30 are to be replenished with grease or oil, or when any of the parts are to be repaired or replaced, it is only necessary to swing open the door 17 about the hinges 18 and then the blower 28 and associated parts can be slid from the position shown in Figures 1–3 to the position shown in Figures 4 and 5. Thus, the lower lips 26 on the plates 22 will slide outwardly in the lower tracks 20, while the upper lips 25 will slide outwardly in the upper tracks or rails 20. Thus, with the parts in their outward extended position as shown in Figures 4 and 5 a mechanic or other person can readily gain access to all of the various parts. By loosening the bolt and nut assemblies 47, the motor 35 can be adjusted along an axis parallel to the bar 44. Also, by loosening the proper bolts 42, the body member 43 and motor 35 can be pivoted slightly so that the shaft 36 will move through the cutouts 39' whereby there is provided a means for adjusting the tension of the belt 38 as desired.

The plates 22 thus provide a support for the motor 35 and blower 28 and also help protect these parts. The support member 39 helps to brace the parts and maintain the parts in their proper assembled position. The louver openings 19 provide a means whereby air can enter the housing and prevent overheating of the motor.

I claim:

1. In combination, a housing including a vertically disposed back wall, spaced parallel horizontally disposed top and bottom walls, a conduit extending through said top wall for conveying hot air from a source of supply, there being an opening in the bottom wall of said housing for the egress therethrough of hot air, the front of said housing being open, a door hingedly connected to the front of said housing and provided with a plurality of spaced parallel louver openings therein, a pair of rails secured to each of said top and bottom walls and said rails including offset portions defining trackways, a pair of similar vertically disposed spaced parallel plates having horizontally disposed lips on their upper and lower edges slidably engaging said trackways, a reinforcing rib extending vertically along the rear edge of each plate, a blower positioned between said pair of plates and secured thereto, a driven shaft extending through said blower, a support member including a pair of spaced parallel ears secured to the outer surface of said plates, a web interconnecting said pair of ears together and arranged at right angles to said ears, a body member including a pair of spaced parallel lugs secured to the inner surface of said plates, a bar interconnecting said pair of lugs together and provided with a longitudinally extending slot, a motor having securing elements extending through said slot, a drive shaft extending through said motor, there being a pair of opposed curved cutouts in said plates for the projection therethrough of said drive shaft, and means interconnecting said drive shaft and driven shaft together.

2. The structure as defined in claim 1, wherein said means comprises a belt and pulley mechanism.

3. The structure as defined in claim 1, wherein there is provided in the housing a stop member embodying an angle iron adapted to be engaged by the inner edges of said plate for limiting inward movement of said plates.

4. The structure as defined in claim 1, wherein said plates and blower and motor are adapted to be moved outwardly of the housing when the door is opened.

References Cited in the file of this patent
UNITED STATES PATENTS
2,464,473    Wessel --------------- Mar. 15, 1949